United States Patent
Suffner et al.

(10) Patent No.: US 10,954,842 B2
(45) Date of Patent: Mar. 23, 2021

(54) TUBING COMPRISING A CONNECTOR AS WELL AS A METHOD FOR OPERATING SAID TUBING

(71) Applicant: TI Automotive (Fuldabrück) GmbH, Fuldabrück (DE)

(72) Inventors: Ingo Suffner, Fuldabrück (DE); Iris Barthel, Schauenburg (DE); Gerd Fischbach, Borken (DE); Albert Choo, Incheon (KR); Reiner Rohde, Malsfeld (DE); Kay Bube, Schenklengsfeld (DE); Michael Weissing, Heidelberg (DE)

(73) Assignee: TI AUTOMOTIVE (FULDABRÜCK) GMBH, Fuldabrück (DE)

( * ) Notice: Subject to any disclaimer, the term of this patent is extended or adjusted under 35 U.S.C. 154(b) by 0 days.

(21) Appl. No.: 15/939,668

(22) Filed: Mar. 29, 2018

(65) Prior Publication Data
US 2018/0283253 A1    Oct. 4, 2018

(30) Foreign Application Priority Data

Mar. 29, 2017   (EP) ..................... 17163633

(51) Int. Cl.
*F01N 3/28*   (2006.01)
*F16L 53/38*  (2018.01)
(Continued)

(52) U.S. Cl.
CPC ......... *F01N 3/2896* (2013.01); *F01N 3/2066* (2013.01); *F16L 53/38* (2018.01);
(Continued)

(58) Field of Classification Search
CPC ...... F01N 3/2066; F01N 3/2896; F16L 53/38; H05B 2203/021; H05B 3/06; H05B 3/42
See application file for complete search history.

(56) References Cited

U.S. PATENT DOCUMENTS 9,360,147 B2 * 6/2016 Schwarzkopf .......... F16L 53/34
9,464,852 B2   10/2016 Mann et al.
(Continued)

FOREIGN PATENT DOCUMENTS

EP   2 420 714 A2   2/2012
EP   2 706 280 A1   3/2014
(Continued)

OTHER PUBLICATIONS https://www.parker.com/Literature/Brass%20Products/Bul%20SAE%20J2044.pdf (Year: 2015).*
(Continued)

*Primary Examiner* — Anthony Ayala Delgado
(74) *Attorney, Agent, or Firm* — Dickinson Wright PLLC (57) ABSTRACT

A tubing for a fluid medium of motor vehicles, particularly for an aqueous urea solution, comprises a tube and a connector arranged on one tube end of the tube. The connector has a connecting part, a heating wire, and a housing which encloses the connecting part and the heating wire. The connecting part comprises a retaining element for an engaging connection of a plug that can be plugged into the connecting part. The heating wire extends at least from the connecting end associated with the tube end into the intermediate section, wherein at least along the intermediate section of the connecting part, the connector is preferably free of alignment elements arranged in or on the connecting part and used for aligning the heating wire.

22 Claims, 3 Drawing Sheets

(51) Int. Cl.
*F01N 3/20* (2006.01)
*H05B 3/06* (2006.01)
*H05B 3/42* (2006.01)
(52) U.S. Cl.
CPC ............. *H05B 3/06* (2013.01); *H05B 3/42* (2013.01); *H05B 2203/021* (2013.01)

(56) References Cited

U.S. PATENT DOCUMENTS

| | | | |
|---|---|---|---|
| 2008/0271801 A1* | 11/2008 | Sonderegger | F16L 53/38 138/33 |
| 2008/0293275 A1* | 11/2008 | Osada | H01R 13/6273 439/188 |
| 2012/0234421 A1* | 9/2012 | Powell | F16L 53/38 138/33 |
| 2014/0230941 A1 | 8/2014 | De Beer et al. | |

FOREIGN PATENT DOCUMENTS

| WO | WO 2013/053478 A1 | 4/2013 |
|---|---|---|
| WO | WO 2016/034284 A1 | 3/2016 |

OTHER PUBLICATIONS https://www.druflon.com/heating.html (Year: 2011).*
International Search Report for European Application No. EP 17 16 3633, dated Sep. 22, 2017, 8 pgs.

* cited by examiner

TUBING COMPRISING A CONNECTOR AS WELL AS A METHOD FOR OPERATING SAID TUBING

RELATED APPLICATIONS

The present patent document claims the benefit of priority to European Patent Application 17163633.5, filed Mar. 29, 2017, and entitled "Tubing Comprising A Connector As Well As A Method For Operating Said Tubing" the entire contents of which are incorporated herein by reference.

FIELD

The present disclosure relates to a tubing for a fluid medium of motor vehicles, particularly for an aqueous urea solution, comprising a tube and a connector arranged on one tube end of the tube. The connector has a connecting part, a heating wire, and a housing which encloses the connecting part and the heating wire. The connecting part comprises a retaining element for an engaging connection of a plug that can be plugged into the connecting part. The present disclosure further relates to a method for operating such a tubing.

BACKGROUND

One tubing is known, for example, from EP 2 137 449 B1. On its outer side, the connecting part has a multiplicity of alignment elements for aligning the heating wire in or on the connecting part. For example, the heating wire can be guided helically or with a meander-like course on the outside of the connecting part, resulting in a relatively even distribution of the heat output on the connecting part. The alignment elements significantly facilitate the arrangement of the heating wire on the outside of the connecting part and thus contribute to a reduction of the effort during the arranging of the heating wire on the connecting part. However, it has become apparent that the alignment of the heating wire on the outside of the connecting part is still very elaborate even with the alignment elements. For example, the mechanical arrangement of the heating wire in the alignment elements or around the alignment elements is very elaborate, and so the corresponding wire arranging device is very expensive.

The present disclosure therefore addresses the problem of manufacturing costs and particularly the effort for the arrangement of the heating wire on the connecting part. The present disclosure further addresses the technical problem of providing a method for operating a tubing, wherein the tubing is characterized by low manufacturing costs.

BRIEF SUMMARY

The present disclosure teaches a tubing for a fluid medium of motor vehicles, particularly for an aqueous urea solution, comprising a tube and a connector arranged on one tube end of the tube, wherein the connector has a connecting part, a heating wire, and a housing which encloses the connecting part and the heating wire, wherein the connecting part comprises a retaining element for an engaging connection of a plug that can be plugged into the connecting part, wherein the housing has an inner side facing the connecting part, and an outer side, The connecting part preferably comprises two connecting ends for connecting in a fluid-tight manner, wherein one of the two connecting ends is associated with the retaining element, and one of the two connecting ends is associated with the tube end, wherein the connecting part has an intermediate section between the connecting ends, wherein the connecting part has an outer side facing the housing, and an inner side, wherein the inner side of the connecting part forms a channel, which connects the connecting ends to one another for the purpose of conducting the fluid medium through the connecting part.

The heating wire preferably extends at least from the connecting end associated with the tube end into the intermediate section. At least along the intermediate section of the connecting part, the connector is preferably free of alignment elements arranged in or on the connecting part and used for aligning the heating wire.

The present disclosure is based on the basic understanding that the alignment elements are not required for a sufficient heating of the fluid medium. The result is an entirely new design of the connecting part, in which the alignment elements for aligning or guiding the heating wire are completely forgone. Every time connectors for aqueous urea solutions were heated with a heating wire, alignment elements were always provided for aligning the heating wire. It appears that this teaching was taken for granted and no longer brought into question. The present disclosure breaks with said teaching and thus achieves a reduction of the effort for the manufacture and particularly for the arrangement of the heating wire on the connecting part. The lack of alignment elements on the connecting part is additionally advantageous because the connecting part can also be used for unheated tubings, which results in savings regarding a corresponding injection mold for the connecting part.

The term "heating wire" refers particularly to those heating elements, through which an electric current can flow and which, due to the electric current, emit a heat quantity. "Heating wire" refers particularly to the electrically heatable wire section which does not bear against the inside tube. By contrast, the term "heat conductor" preferably refers to the electrically heatable wire section that bears against the inside tube. The term "intermediate section" preferably refers to the section which extends from one end face of the tube to the retaining element.

The term "alignment element" preferably refers to those elements that are only used to align the heating wire. As can be seen from the prior art, such alignment elements can, for example, be grooves or pins or protrusions which are expediently arranged on the outer side of the connecting part. By contrast, the outer side of the connecting part as such is not to be understood to be an alignment element in accordance with the present disclosure; it is possible that the outer side of the connecting part contacts and thus deforms and also aligns the heating wire, but the outer side of the connecting part is not exclusively used to align the heating wire. The primary purpose of the connecting part and thus also its outer side is the fluidic connection between the tube and the plug. The outer side of the connecting part is therefore not an alignment element in accordance with the present disclosure. Alignment elements according to the present disclosure are particularly preformed elements which are produced, for example, by injection molding together with the connecting part. However, the alignment elements can also be attached to the connecting part or the inner side of the housing by means of integral bonding (gluing or welding) and/or an interlocking connection (particularly a catch mechanism) and/or by means of a force-locking connection (e.g., crimping). The term "alignment element" refers particularly to those elements, the walls of which protrude radially from the connecting part on the outer side of the connecting part. Furthermore, the term "alignment element" does particularly not refer to those elements which merely press the heating wire against the connecting part, for example, adhesive tapes or shrinking tubes. Aside from applying the heating wire to the connecting part, the alignment elements preferably do not cause a change of direction of the heating wire on the preferably cylindrical outer side of the connecting part.

The term "section" preferably refers to the axial extension of an area. The term "axial" preferably refers to the axis of the connecting part or the tube or the axes of the connecting part in case of an angled connecting part. According to an advantageous embodiment, a space between the inner side of the connecting part and the outer side of the housing is at least along the intermediate section of the connecting part free of alignment elements for aligning the heating wire. Along the entire length of the connecting part, the connector is preferably free of alignment elements for aligning the heating wire arranged in or on the connecting part. The term "entire length" preferably refers to the axial extension of the connecting part from one end face to the other end face. Particularly preferably, the connector is entirely free of alignment elements which are merely used to align the heating wire. This does particularly not include those elements which, in addition to the heating wire, also align electrical connections. The term "tube" preferably refers to a pipe, such as a rigid tube.

According to a particularly preferred embodiment, a heat conducting element is arranged in the interior of the tube end and extends into the connecting part. Expediently, the heat conducting element is designed such that the heat of the heat conductor or heat conductors transfers to the heat conducting element, and so the channel of the connecting part is heated via the heat conducting element. The heat conducting element is preferably arranged in the interior of the inside tube. Preferably, an inner side of the inside tube encloses the heat conducting element along a first axial section. Advantageously, the connecting part, and preferably the inner side of the connecting part, encloses the heat conducting element along a second axial section. An inner side of the inside tube is preferably in contact with the heat conducting element, wherein the contact is preferably a pressure contact. Expediently, the pressure contact is designed in radial direction. The heat conducting element is preferably arranged in the interior of the tube end such that it can be made to contact the fluid. It is advantageous if the heat conductor or the heat conductors of the tube and/or the heating wire or the heating wires overlap in sections with the heat conducting element in radial direction. Preferably, the heat conductor or heat conductors of the tube enclose the heat conducting element—preferably contactless—along a first axial section. Expediently, the heat conducting element and the heat conductor or the heat conductors of the tube are separated from one another by the inside tube. The heat conducting element preferably comprises metal or a thermally conductive plastic. The heat conducting element, for example, can be designed as a sleeve, a rod, or as a coil spring, wherein the heat conducting element is preferably designed as a coil spring. Particularly preferably, the heat conducting element is heated only indirectly by means of the external heat conductor or heat conductors of the tube and/or the external heating wire/heating wires of the connecting part. Preferably, at least 20%, further preferably at least 25%, and more particularly preferably at least 30% of the heat conducting element are arranged in the tube.

According to a particularly preferred embodiment, the heating wire is attached and particularly clamped to the tube. In addition to the clamps, the fastening of the heating wire on the tube comprises, for example, a catch mechanism, gluing, or welding. Preferably, the heating wire is attached only to the tube or tube end, and is particularly not fastened to the connecting part or the housing. Expediently, the heating wire is attached to the tube indirectly, particularly by means of electrical connections and preferably in a force-locked manner. Particularly preferably, the electrical connections are fastened to the tube and preferably to the tube end preferably in a force-locked manner. Expediently, the electrical connections are particularly not fastened to the connecting part and/or the housing. Expediently, the tubing is designed such that a mechanical stress of the heating wire is initially transmitted via the tube and only subsequently applied to the connecting part.

According to a particularly preferred embodiment, a holder is arranged on the tube end for holding the heating wire/heating wires or electrical connections. Preferably, the holder holds at least one PTC thermistor and preferably two PTC thermistors, wherein the PTC thermistors are expediently connected in the electrical connections to the heating wire or heating wires. Expediently, the holder is designed so as to be separate from the connecting part and the housing. Preferably, the holder does not contact the housing and/or the connecting part. Expediently, the holder only contacts the tube as well as one or more electrical connections or the PTC thermistor(s) or the heating wire/heating wires. Expediently, the holder can be attached to the tube end with a catch mechanism, wherein the catch is preferably reversible. It is preferred that the catch of the holder, in addition to an integral connection, also forms a force-locking connection, and so the tube or tube end is clamped in the holder after it engages. Particularly preferably, the holder sits on a shrinking tube arranged on the tube end. Expediently, the shrinking tube seals a protective tube or the protective tube with an inside tube or the inside tube. The holder preferably comprises a grove for engaging with the tube or tube end.

Particularly advantageously, the holder comprises at least one, preferably at least two, and particularly preferably at least three receptacles for receiving one electrical connection each. Expediently, the receptacle is or the receptacles are designed so as to be tubular and preferably hollow cylindrical. The electrical connections are attached in the receptacles, preferably form- and/or force-locked in a reversible manner and particularly clamped. Advantageously, the receptacle is or the receptacles for the electrical connections are designed so as to be parallel to the axis of the tube. Preferably, openings of the receptacles for inserting the electrical connections are aligned toward the connecting part. Advantageously, on the end facing away from the connecting part, the receptacles have a stop, with which the axial position of the electrical connections is defined. In case of three receptacles, the receptacles are each distributed with regard to the tube axis—for example—at a distance of approximately 120° to one another around the tube or inside tube.

It is very advantageously preferred if the heating wire has a strand with a plastic coating, wherein the plastic coating preferably comprises a fluoroplastic. The fluoroplastic is preferably a thermoplastic material and particularly preferably polyvinylidine fluoride (PVDF). The plastic coating preferably has a thickness of at least 0.05 mm, further preferably of at least 0.10 mm, and particularly preferably of at least 0.12 mm. Expediently, the plastic coating has a thickness of no more than 1.0 mm, preferably of no more than 0.6 mm, and particularly preferably of no more than 0.4 mm. It is particularly preferred that the strand is noticeable through the plastic coating. Expediently, the strand comprises one or more single wires and preferably has copper or a copper-nickel alloy. Expediently, the strand has a thickness of at least 0.3 mm, preferably of at least 0.4 mm, and particularly preferably of at least 0.5 mm. Advantageously, the strand has a thickness of no more than 1.2 mm, further advantageously of no more than 1.0 mm, and particularly advantageously of no more than 0.8 mm.

According to a particularly preferred embodiment, the heating wire is attached in a form- and/or force-locked manner and particularly clamped between the connecting part—preferably between the intermediate section—and the housing. It is expedient that the housing has a housing section on its inner side for clampingly receiving the heating wire. It is preferred that the section of the heating wire received in the housing section is longer than the housing section in axial direction. The clamped section of the heating wire is, for example, folded in a helical or loop-like or meander-like manner in the housing section for clampingly receiving the heating wire. It is preferred that the folded section of the heating wire is helical. The helical section is preferably arranged next to and further preferably only on one side next to the connecting part. Preferably, the axis of the helical section lies approximately perpendicular to the axis of the connecting part. It is also possible that the axis of the helical section is aligned parallel to the axis of the connecting part.

According to a particularly preferred embodiment, the housing comprises housing parts which are connected to one another. The term "connected to one another" indicates particularly that the housing parts were originally not connected to one another, and so the housing has a connecting point or connecting points after the connection. These connecting points are, for example, catch elements, weld seams, or the like. Preferably, the housing comprises at least two and particularly preferably only two housing parts. The housing parts are preferably housing shells and particularly preferably two housing half-shells. A one-piece housing with two housing parts initially connected to one another, e.g. by means of a film hinge, is also possible. Expediently, the housing is designed such that it encloses a space between itself and the connecting part which is filled with air. Particularly in case of a housing in the form of an overmold around the connecting part, the term "space filled with air" does not apply. Expediently, the heating wire or heating wires are located at least in sections within the space filled with air. Preferably, the heating wire and/or the space filled with air extend from the connecting end associated with the tube end at least into the intermediate section. Advantageously, the electrical connection or the electrical connections are arranged in the space filled with air. It is expedient that at least the connecting end associated with the tube end and at least a segment of the intermediate section are enclosed by the space filled with air. It is possible that at least a segment of the tube end is enclosed by the space filled with air. Preferably, a holder or the holder is arranged in the space filled with air. According to a particularly preferred embodiment, the space filled with air extends from end face to end face of the housing. Particularly preferably, no plastic is injected into the housing. It is preferred that at least the end face of the housing associated with the retaining element has a meshing element for meshing with a meshing element of the connecting part. Expediently, the meshing element of the housing and the meshing element of the connecting part form an interlocking connection at least in axial direction.

It is expedient that the tube comprises an inside tube and a protective tube, wherein the protective tube is preferably sealed at the tube end with regard to the inside pipe—particularly by means of a protective element in the form of a shrinking tube or a rigid sleeve. Particularly advantageously, a shrinking tube is arranged on the tube end. The tube preferably comprises one, or further preferably two, heat conductors, wherein the heat conductor(s) is/are wound preferably helically around the inside tube. Advantageously, the heat conductor(s) bear(s) against the inside tube. According to a particularly preferred embodiment, the two heat conductors are wound double-helically around the inside tube. It is expedient that the heat conductor(s) is/are attached to the inside tube by means of a fixation part. The fixation part, for example, is an adhesive tape which is wound preferably helically around the inside tube and around the heat conductor(s). The shrinking tube on the tube end expediently encloses the heat conductor(s) and preferably also the fixation part. The protective tube, for example, is a corrugated tube or a tube with a constant inner and outer diameter. Particularly preferably, the inside tube with the heat conductor or heat conductors and preferably with the adhesive tape is designed to be longer than the protective tube, and so the inside tube protrudes beyond the protective tube. The term "tube end" refers particularly to the end section of the tube which is free of the protective tube. Particularly preferably, the housing encloses the tube end and a section of the protective tube. Particularly preferably, the housing is in mesh with the protective tube, and so the protective tube is arranged in a strain-resistant manner in the housing.

It is preferred that the tube end is inserted into the connecting end of the connecting part which is associated with the tube end. The connecting end associated with the tube end expediently comprises a receptacle for inserting the tube end or the inside tube, wherein the receptacle preferably has a stop for the tube end or the inside tube. It is preferred that the inner diameter of the receptacle is dimensioned such that the inside tube is clamped into the receptacle, forming a force-locked connection. Particularly preferably, the inside tube is integrally and irreversibly connected to the receptacle of the connecting end, for example, by means of laser beam welding. It is expedient that the connecting part is dyed black, wherein the connecting part is simultaneously translucent for infrared or near infrared radiation of the laser, and so the heat quantity introduced into the connecting end by the laser reaches the inside tube. Expediently, the inside tube is dyed black and preferably designed to be opaque with regard to infrared and near infrared radiation.

It is advantageous if the housing has a meshing element for meshing with the connecting part. The meshing element of the housing, for example, is a groove or a flange. In the area of the connecting end, which is associated with the retaining element, the connecting part preferably comprises a meshing element for meshing with the meshing element of the housing. The meshing element of the connecting part, for example, is a flange or a groove. It is preferred that the housing has a holding element for meshing in the protective tube. The holding element is preferably designed as a flange which, for example, meshes with a groove of the protective tube. The holding element is preferably arranged on the end face of the housing which is associated with the tube end. It is preferred that the housing has further support elements on its inner side, wherein the support elements are used to position the connecting part in the housing.

According to a particularly preferred embodiment, the housing encloses at least one electrical connection and preferably at least two and particularly preferably at least three electrical connections, for example, for contacting the heating wire with a PTC thermistor for an external electrical plug connection. The term "electrical connection" refers particularly to a clamped connection or a solder connection. The term "electrical connection" does particularly not comprise those embodiments, in which the heat conductor or heating wire run continuously in the housing. The electrical connections preferably comprise shrinking tubes and electrical contacts, wherein the electrical contacts expediently have crimp sleeves. According to a first embodiment, the housing encloses only one electrical connection. In this case, the inside tube has only one heat conductor, wherein the heat conductor transitions inside the housing into the heating wire, and in the electrical connection is connected to a PTC thermistor, which in turn is guided out of the housing. According to a second embodiment, the tube has two heat conductors, wherein the heat conductors transition inside the housing into two heating wires, wherein each of the two heating wires is connected in one of the two electrical connections to one PTC thermistors each. According to a third embodiment, the housing encloses three electrical connections. According to this embodiment, the tube comprises two heat conductors and the connector comprises its own separate heating wire. In the first electrical connection, the first heat conductor and the first end of the heating wire are connected to one another. In the second electrical connection of this embodiment, the second end of the heating wire and a first PTC thermistor are connected to one another. In the third electrical connection, the second heat conductor and the second PTC thermistor are connected to one another. According to a fourth embodiment, the connector has its own separate heating wire, and the tube comprises two heat conductors. The first heat conductor is connected to the first end of the heating wire by means of a first electrical connection, while the second heat conductor is connected to the second end of the heating wire by means of a second electrical connection. According to this embodiment, the connector has no PTC thermistor. As a result, the housing encloses two electrical connections. According to a fifth embodiment, the housing encloses no electrical connection because a first heat conductor of the tube transitions inside the housing into the heating wire, and the heating wire transitions into a second heat conductor, when it is guided back into the tube.

It is particularly preferred if the housing and the holder are designed such that they do not contact one another. Advantageously, the electrical connection or the electrical connections and the housing do not contact one another. It is expedient that the electrical connections or the holder are a few millimeters apart from the inner side of the housing.

According to a possible embodiment, the connecting part is designed so as to have several parts and particularly preferably has at least three separate parts. It is expedient that the retaining element is designed as a separate part for a releasable locking, wherein the retaining element preferably has one head section and two side limbs. In particular, the two side limbs are used to releasably lock the plug in place. The connecting part preferably comprises a head section, in which the retaining element is arranged, as well as a sealing part, wherein the sealing part has the connecting end associated with the tube end. Expediently, the sealing part accommodates the head section, wherein the sealing part and the head section are preferably in mesh with one another. Expediently, a sealing arrangement for fluid-tight sealing of the plug is provided in the sealing part.

The present disclosure teaches a method for operating a tubing, particularly a tubing according to the present disclosure, wherein the tubing comprises a tube and a connector, which is arranged on a tube end of the tube, wherein the connector has a connecting part, a heating wire, and a housing which encloses the connecting part and the heating wire, wherein the connecting part has a retaining element for an engaging connection of a plug that can be plugged into the connecting part, wherein the housing has an inner side facing the connecting part, and an outer side, wherein the connecting part comprises two connecting ends for connecting in a fluid-tight manner, wherein one of the two connecting ends is associated with the retaining element, and one of the two connecting ends is associated with the tube end, wherein the connecting part has an intermediate section between the connecting ends, wherein the connecting part has an outer side facing the housing, and an inner side, wherein the inner side of the connecting part forms a channel, which connects the connecting ends to one another for the purpose of conducting the fluid medium through the connecting part, The heating wire preferably extends at least from the connecting end associated with the tube end to the intermediate section, wherein a heat conductor runs along at least a section of the tube and is connected to the heating wire.

During operation of the tubing, the heating wire heats the connecting part from the outside, and the heat conductor heats the tube.

A heat conducting element is preferably arranged in the interior of the tube end and extends into the connecting part, and so during operation of the tubing, the heat conducting element absorbs some of the heat quantity generated by the heat conductor and guides it into the connecting part, and so the connecting part is heated from inside.

BRIEF DESCRIPTION OF THE DRAWINGS

In the following, the present disclosure shall be explained in more detail using a drawing showing only one embodiment. The drawings show schematically in FIG. 1 a perspective view of a tubing according to the present disclosure.

DETAILED DESCRIPTION

Figure 1:
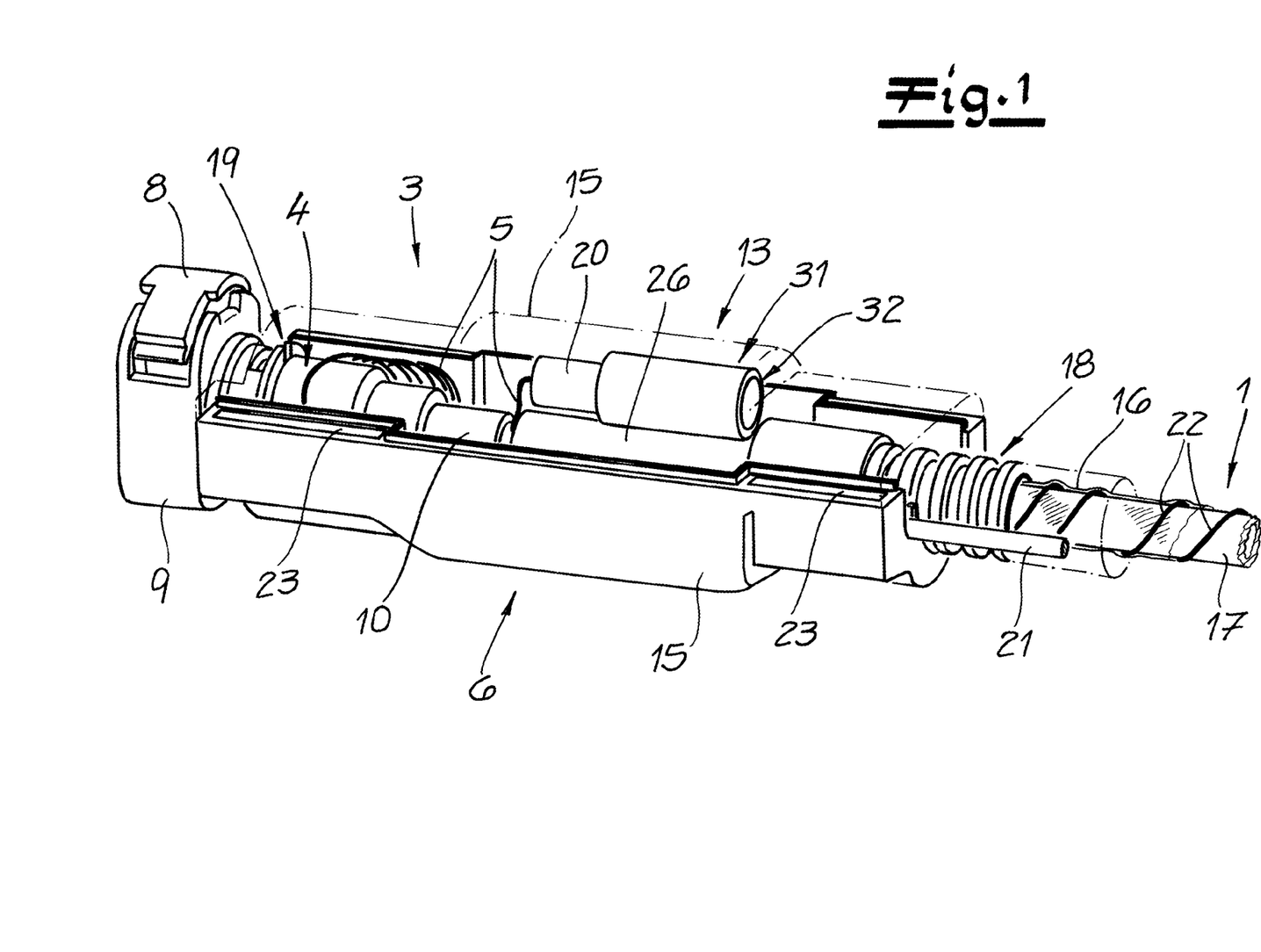

In FIG. 1, a tube 1 is provided on its left end with a connector 3. The tube 1 comprises an inside tube 17, two heat conductors 22 in the form of wires preferably double-helically wound around the inside tube 17, as well as a protective tube 18 in the form of a corrugated tube. The two heat conductors 22 are immovably fastened to the inside tube 17 by means of a fixation part 16 in the form of an adhesive tape, and are subsequently encased by the protective tube 18. The connector 3 comprises a connecting part 4 as well as a housing 6. The connecting part 4 has two connecting ends 9, 10, wherein the left connecting end 9 comprises a retaining element 8. The left connecting end 9 is designed to receive a plug (not depicted), wherein the retaining element 8 is used for releasably engaging the plug. The right connecting end 10 has a receptacle, into which the inside tube 17 is inserted. The inside tube 17 is attached in the connecting end 10 by means of laser transmission welding.

The protective tube 18 is designed to be shorter than the inside tube 17, and so the inside tube 17 protrudes beyond the protective tube 18. The term "tube end" refers particularly to the length, by which the inside tube 17 protrudes beyond the protective tube 18. Approximately at the entry of the inside tube 17 into the receptacle of the connecting end 10, the heat conductors 22 no longer bear against the inside tube 17 and are subsequently called heating wires 5. Each of the two heating wires 5 then runs into one electrical connection 20 each. The electrical connections 20 preferably have a shrinking tube, in the right end of which a crimp sleeve is located. This is where one of the two heating wires 5 is connected to a PTC thermistor 21, while the other of the two heating wires 5 of the tube 1 is connected to a heating wire 5 of the connecting part 4.

The heating wire 5 of the connecting part 4 extends into the intermediate section 11 of the connecting part 4 and is clamped in this position between the connecting part 4 and a housing section to clampingly receive the heating wire 5. In this housing section, the heating wire 5 is folded in a helically offset manner. The second end of the heating wire 5 of the connecting part 4 subsequently runs back and eventually into a third electrical connection 20. This electrical connection 20 also sits in a receptacle 31 of the holder 13. In this electrical connection 20, the heating wire 5 of the connecting part 4 is connected to a second PTC thermistor 21.

Each of the three electrical connections 20 is securely clamped in a hollow cylindrical receptacle 31 of a holder 13. The holder 13 has a groove 12 for receiving the tube end 2 in an engaging and clamping manner. The tube end 2 is provided with a shrinking tube 26 which seals the protective tube 18 with regard to the inside tube 17. The shrinking tube 26 further protects the two heat conductors 22 in the section, in which the inside tube 17 protrudes beyond the protective tube 18. The shrinking tube 26 allows for an attachment of the tube end 2 in the holder 13 without complications.

The housing 6 comprises two housing half-shells 15, wherein the upper housing half-shell 15 in FIG. 1 is only indicated. The two housing half-shells 15 are connected to one another by catch means 23, and are made to be in mesh with corresponding protrusions of the connecting part 4 by means of meshing elements 19 on the end face associated with the retaining element 8. On the end face associated with the tube end 2, the housing half-shells 15 additionally have a recess for receiving the protective tube 18. At least one of the two half-shells 15 also has recesses, through which one of the two or both PTC thermistors 21 are guided. The housing half-shells 15 overlap the protective tube 18 in axial direction along a segment. The two housing half-shells 15 entirely enclose the tube end 2, the shrinking tube 26, the holder 13, the electrical connections 20 as well as the heating wires 5. However, the connecting part 4 is only for the most part covered by the housing 6.

Figure 2:
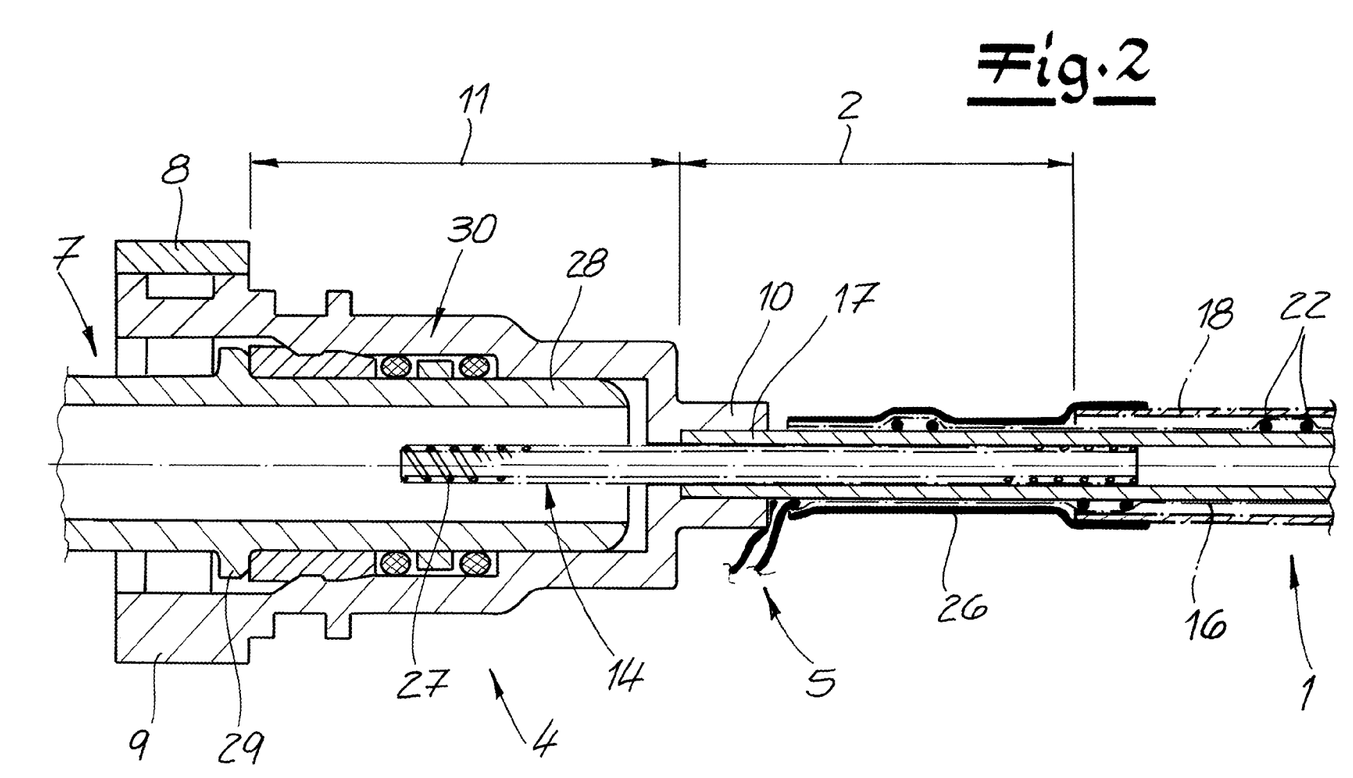
FIG. 2 a longitudinal section of the tubing from FIG. 1 without housing, holder, electrical connections, and the heating wire enclosed by the housing.

FIG. 2 shows the longitudinal section of the tubing from FIG. 1, wherein for reasons of simplification, the housing 6, the holder 13, the electrical connections 20, the two heating wires 5, and the PTC thermistors 21 are not shown. On the left end of FIG. 2, the connecting part 4 with the connecting end 9 and the retaining element 8 can be seen. In the connecting part 4, a sealing arrangement 30 is arranged which comprises two sealing rings, a spacer between the sealing rings, and a catch ring which secures these three elements in place. In the connecting part 4, a plug 7 is engaged which has a plug shaft 28 and an annular collar 29. The plug shaft 28 is dimensioned such that it forms a force-locking connection with the sealing arrangement 30, thus sealing the fluidic connection. The annular collar 29 is releasably engaged behind two catch limbs (not depicted) of the retaining element 8.

The right half of FIG. 2 clearly shows the structure of the tube 1. The inside tube 17, made, for example, of polyamide, is enclosed by the two heat conductors 22 in a double-helical manner, wherein the fixation part 16 in the form of the adhesive tape also helically encloses the two heat conductors 22, causing the two heat conductors 22 to bear against the inside tube 17. This structure is eventually encased by the protective tube 18 in the form of a corrugated tube, wherein in this drawing, the corrugated tube is only shown schematically. At the tube end 2, the shrinking tube 26 assumes the mechanical protective function up to the connecting end 10 of the connecting part 4. The shrinking tube 26 has the additional function of sealing the protective tube 18. In the inside tube 17, a heat conducting element 14 is arranged on the tube end 2, said heat conducting element 14 extending into the connecting part 4, or into an intermediate section 11 of the connecting part 4, and into the plug shaft 28. The heat conducting element 14 is designed as a coil spring with coils 27, is made of metal, and applies a pressure from inside to the inside tube 17, and so the heat conducting element 14 is held securely in the inside tube 17.

Figure 3:
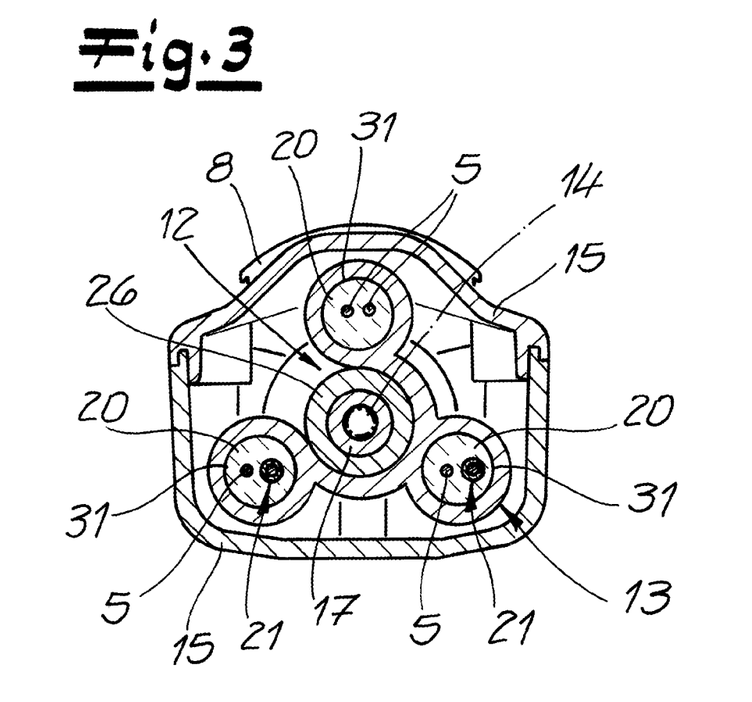
FIG. 3 a cross-section of the housing, the holder, and the tube end from FIG. 1 with both housing parts.

FIG. 3 shows a cross-section of the housing 6, the holder 13, and the tube end 2 from FIG. 1. The electrical connections are inserted into the receptacles 31 from the direction of the connecting part 4. All receptacles 31 are designed such that they receive the electrical connections 20 in a crimping manner, thus applying force-locking pressure to the electrical connections 20. In addition, the receptacles 31 for the electrical connections 20 each have a stop 32 on their ends facing the protective tube 18 in order to define the axial position of the electrical connections 20. The stops 32 simultaneously are a strain relief for the electrical connections 20.

Figure 4:
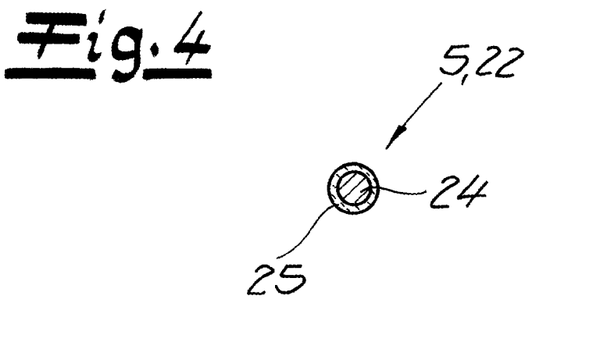
FIG. 4 a cross-sectional view of the heating wire or the heat conductor from FIGS. 1 and 3, and/or 2.

FIG. 4 shows a cross-section of the heating wires 5 and thus also of the heat conductors 22. The heating wires 5 or the heat conductors 22 contain a strand 24 which is enclosed by a plastic coating 25. The plastic coating 25 preferably contains polyvinylidine fluoride (PVDF) and is translucent in this embodiment, and so the embedded strand 24 is visible. In addition to the mechanical protection, the plastic coating 25 is especially also used to prevent electrical shorts.

The invention claimed is:

1. Tubing for a fluid medium of motor vehicles comprising:
    a tube; and
    a connector arranged on one tube end of the tube, wherein the connector has a connecting part, a heating wire, and a housing which encloses the connecting part and the heating wire, wherein the connecting part comprises a retaining element for an engaging connection of a plug that can be plugged into the connecting part, wherein the housing has an inner side facing the connecting part, and an outer side;
    wherein the connecting part has two connecting ends for connecting in a fluid-tight manner, wherein a first connecting end is associated with the retaining element, and a second connecting end is associated with the tube end, wherein the connecting part has an intermediate section between the connecting ends, wherein the connecting part has an outer side facing the housing, and an inner side, wherein the inner side of the connecting part forms a channel, which connects the first and second connecting ends to one another for the purpose of conducting the fluid medium through the connecting part;

wherein the heating wire extends at least from the second connecting end associated with the tube end into the intermediate section, and wherein, at least along the intermediate section of the connecting part, the connector is free of alignment elements arranged in or on the connecting part and used for aligning the heating wire;

wherein a heat conducting element is arranged in the interior of the tube end and said heat conducting element extends into the connecting part.

2. The tubing according to claim 1, wherein a space between the inner side of the connecting part and the outer side of the housing is at least along the intermediate section of the connecting part free of alignment elements for aligning the heating wire.

3. The tubing according to claim 1, wherein a heat conducting element is arranged in the interior of the tube end and said heat conducting element extends into the connecting part.

4. The tubing according to claim 1, wherein the heating wire is attached to the tube end and particularly attached in a form- and/or force-locked manner.

5. The tubing according to claim 1, wherein a holder is arranged on the tube end for holding the heating wire or electrical connections.

6. The tubing according to claim 5, wherein the housing and the holder are structured such that they do not contact one another.

7. The tubing according to claim 5, wherein the holder comprises at least three receptacles for receiving one electrical connection each, wherein the receptacles are designed so as to be tubular.

8. The tubing according to claim 5, wherein the holder comprises at least one receptacle for receiving one electrical connection, wherein the receptacle is designed so as to be tubular.

9. The tubing according to claim 8, wherein the receptacle is hollow cylindrical.

10. The tubing according to claim 1, wherein the heating wire has a strand with a plastic coating.

11. The tubing according to claim 10, wherein the plastic coating comprises a fluoroplastic.

12. The tubing according to claim 1, wherein the heating wire is attached in a form-fit or force-locked manner between the connecting part and the housing.

13. The tubing according to claim 1, wherein the housing comprises housing parts which are connected to one another.

14. The tubing according to claim 1, wherein the tube comprises an inside tube and a protective tube, wherein the protective tube is sealed at the tube end with regard to the inside tube.

15. The tubing according to claim 1, wherein the tube end is inserted into the connecting end of the connecting part which is associated with the tube end.

16. The tubing according to claim 1, wherein the housing encloses at least one electrical connection for contacting the heating wire with a PTC thermistor for an external electrical plug connection.

17. The tubing according to claim 1, wherein the connecting part is structured so as to have several parts.

18. The tubing according to claim 1, wherein the heating wire is attached in a form-fit or force-locked manner between the intermediate section and the housing.

19. The tubing according to claim 1, wherein the housing encloses at least three electrical connections for contacting the heating wire with a PTC thermistor for an external electrical plug connection.

20. The tubing according to claim 1, wherein the tube is a rigid pipe.

21. The tubing according to claim 1, wherein the tube comprises an inner tube and a protective tube, and wherein the heating wire forms a heating conductor wound around the inner tube, the protective tube being shorter than the inner tube to expose the heating wire such that the inner tube may be inserted into an opening of the second connecting end while the heating wire extends into the intermediate section.

22. The tubing according to claim 1, further comprising a second heating wire, and wherein the second heating wire extends directly to an electrical connector and the heating wire extends into the intermediate section.

* * * * *